(12) United States Patent
Murphy

(10) Patent No.: US 10,018,408 B2
(45) Date of Patent: Jul. 10, 2018

(54) MODULAR COOLER SHELF AND METHOD OF USE

(71) Applicant: Wesley Kyle Murphy, Houston, TX (US)

(72) Inventor: Wesley Kyle Murphy, Houston, TX (US)

( * ) Notice: Subject to any disclaimer, the term of this patent is extended or adjusted under 35 U.S.C. 154(b) by 55 days.

(21) Appl. No.: 15/264,679

(22) Filed: Sep. 14, 2016

(65) Prior Publication Data

US 2018/0073801 A1   Mar. 15, 2018

(51) Int. Cl.
| | |
|---|---|
| *F25D 25/02* | (2006.01) |
| *A47B 37/00* | (2006.01) |
| *A47B 47/00* | (2006.01) |
| *F16M 13/02* | (2006.01) |
| *F25D 3/06* | (2006.01) |

(52) U.S. Cl.
CPC ........... *F25D 25/02* (2013.01); *A47B 37/00* (2013.01); *A47B 47/00* (2013.01); *F16M 13/02* (2013.01); *F25D 3/06* (2013.01); *F25D 25/022* (2013.01); *F25D 2325/021* (2013.01)

(58) Field of Classification Search
CPC ........ F25D 25/02; F25D 25/022; F16M 13/02
USPC ..................................................... 108/46, 47
See application file for complete search history.

(56) References Cited

U.S. PATENT DOCUMENTS

| | | | | |
|---|---|---|---|---|
| 1,593,834 | A * | 7/1926 | McNeal | A47B 31/06 108/47 |
| 1,593,835 | A * | 7/1926 | McNeal | A47B 31/06 108/47 |
| 2,101,686 | A * | 12/1937 | Offutt | B60N 3/007 108/137 |
| D118,029 | S * | 12/1939 | Webb | D6/682.6 |
| 2,267,861 | A * | 12/1941 | Haley | A47C 7/70 108/135 |
| 2,663,157 | A | 12/1953 | Laramy | |
| 2,680,523 | A * | 6/1954 | Heeter | B60N 3/004 108/44 |
| D182,742 | S * | 5/1958 | Rennels | D7/546 |
| 2,957,585 | A * | 10/1960 | Berlener | B01L 9/00 211/74 |
| 3,125,040 | A * | 3/1964 | Roberson | A47B 31/06 108/18 |
| 3,400,829 | A * | 9/1968 | Youngson | A47D 1/008 108/49 |
| 3,548,610 | A | 12/1970 | Kendall et al. | |
| 3,706,105 | A * | 12/1972 | Nicholas | A47D 13/06 211/88.01 |
| 3,822,847 | A * | 7/1974 | Emmons | E06C 7/14 108/152 |
| 4,074,683 | A * | 2/1978 | Di Chiara | A61H 3/00 135/67 |
| 4,337,751 | A * | 7/1982 | Sampson | A47J 37/0786 108/47 |
| 4,364,480 | A * | 12/1982 | Ohno | A47G 23/0208 211/105 |
| 4,515,421 | A | 5/1985 | Steffes | |

(Continued)

*Primary Examiner* — Stanton L Krycinski

(74) *Attorney, Agent, or Firm* — Ira Domnitz; Ewing Jones, PLLC

(57) ABSTRACT

A portable external cooler shelving trait with modular floor units that can be replaced at a user's discretion. The shelving unit can be used with the cooler when the cooler is open or closed. The shelving unit can have a frame that can be illuminated or magnetized.

18 Claims, 4 Drawing Sheets

(56) References Cited

U.S. PATENT DOCUMENTS

| | | | |
|---|---|---|---|
| 4,565,074 A | 1/1986 | Morgan | |
| 4,730,802 A * | 3/1988 | Chatham | B25H 3/06 182/129 |
| 4,836,403 A | 6/1989 | Blackman | |
| 4,947,991 A | 8/1990 | Snell | |
| 5,211,294 A * | 5/1993 | Garman | B25H 3/06 211/70.6 |
| D346,312 S * | 4/1994 | Spiersch | D32/58 |
| 5,337,677 A * | 8/1994 | Peeno | B60N 3/002 108/45 |
| 5,342,008 A * | 8/1994 | Kay | E06C 7/14 182/129 |
| 5,370,263 A * | 12/1994 | Brown | E06C 7/14 206/373 |
| D376,559 S * | 12/1996 | Elsea | D11/147 |
| D383,607 S * | 9/1997 | Whitlock | D3/305 |
| 5,699,910 A * | 12/1997 | Kubat | B25H 5/00 206/373 |
| 5,803,472 A | 9/1998 | Lien | |
| D418,612 S * | 1/2000 | Deutsch | D25/68 |
| 6,041,717 A * | 3/2000 | Kubat | B60R 11/06 108/44 |
| 6,341,666 B1 * | 1/2002 | Allen | E06C 7/14 182/129 |
| D460,295 S * | 7/2002 | Fissell | D32/58 |
| 6,474,244 B1 * | 11/2002 | Karpinski | E04H 4/14 108/42 |
| D484,251 S * | 12/2003 | Pruett | D25/68 |
| D488,603 S * | 4/2004 | Bardenhagen-Shuster | D32/58 |
| 6,726,050 B1 | 4/2004 | Barentine et al. | |
| 6,823,998 B2 * | 11/2004 | Fabregas | B25H 3/06 206/373 |
| 6,837,383 B1 * | 1/2005 | McElhaney, Jr. | B25H 5/00 206/373 |
| 6,931,998 B1 * | 8/2005 | Leese | A47B 5/02 108/152 |
| D516,227 S * | 2/2006 | Price | D25/68 |
| 7,077,238 B2 * | 7/2006 | Butler | E06C 7/14 182/121 |
| D538,066 S * | 3/2007 | Wagner | D6/681.1 |
| 7,191,905 B2 | 3/2007 | Robertson | |
| 7,240,910 B2 * | 7/2007 | Stuemke | B62B 5/06 280/47.26 |
| 7,290,651 B2 * | 11/2007 | Irwin | A47L 13/51 206/216 |
| D561,541 S * | 2/2008 | Stephen | D7/707 |
| 7,334,802 B2 | 2/2008 | Kaplan | |
| 7,354,023 B1 * | 4/2008 | Wappler | B25H 3/06 248/206.5 |
| 7,415,794 B1 | 8/2008 | Thompson | |
| D576,292 S * | 9/2008 | Brown | D25/68 |
| 7,506,770 B2 * | 3/2009 | Rief | A47L 9/0009 211/70.6 |
| D603,657 S * | 11/2009 | Tu | D7/622 |
| D634,909 S * | 3/2011 | Guthrie | D32/55 |
| 7,954,183 B2 | 6/2011 | Cawthon | |
| 8,083,111 B2 * | 12/2011 | Lase | B60R 9/065 224/400 |
| 8,276,999 B2 | 10/2012 | Hassman et al. | |
| D680,394 S * | 4/2013 | Mirza | D7/707 |
| D684,330 S * | 6/2013 | Ward | D32/58 |
| 8,511,240 B1 * | 8/2013 | Strock | A47B 13/14 108/98 |
| 8,662,501 B1 * | 3/2014 | Perales | A63B 63/08 108/44 |
| 8,777,045 B2 | 7/2014 | Mitchell et al. | |
| 8,910,819 B2 | 12/2014 | Seiders | |
| D723,759 S * | 3/2015 | Evans | D32/55 |
| 9,032,949 B2 * | 5/2015 | Nilssen, II | A45F 3/46 126/25 R |
| 9,316,428 B2 | 4/2016 | Mech | |
| 9,428,958 B1 * | 8/2016 | Ellis | E06C 7/14 |
| 2005/0056486 A1 * | 3/2005 | Butler | E06C 7/14 182/129 |
| 2005/0263468 A1 * | 12/2005 | Wanda | B25H 3/06 211/133.6 |
| 2005/0280228 A1 | 12/2005 | Fernandes et al. | |
| 2007/0095998 A1 * | 5/2007 | Gray | A47B 43/003 248/310 |
| 2007/0101908 A1 * | 5/2007 | Makita | A47B 5/02 108/47 |
| 2008/0230501 A1 * | 9/2008 | Gray | A47B 46/005 211/149 |
| 2009/0139132 A1 * | 6/2009 | Knight | A01K 97/06 43/54.1 |
| 2014/0158645 A1 * | 6/2014 | Thomas | B43K 23/001 211/13.1 |

\* cited by examiner

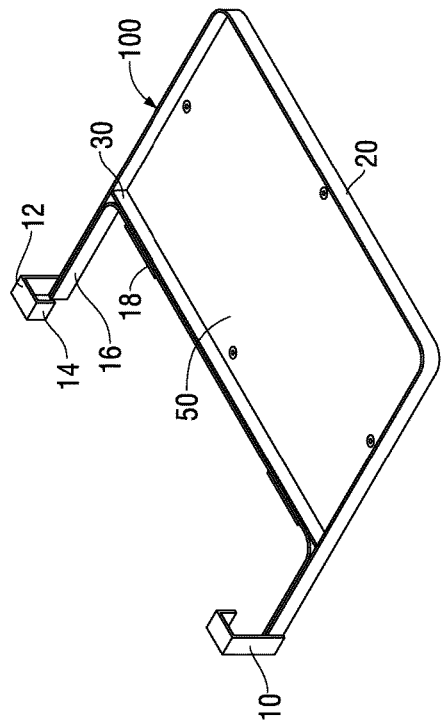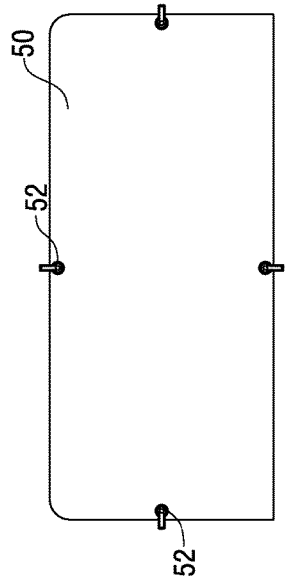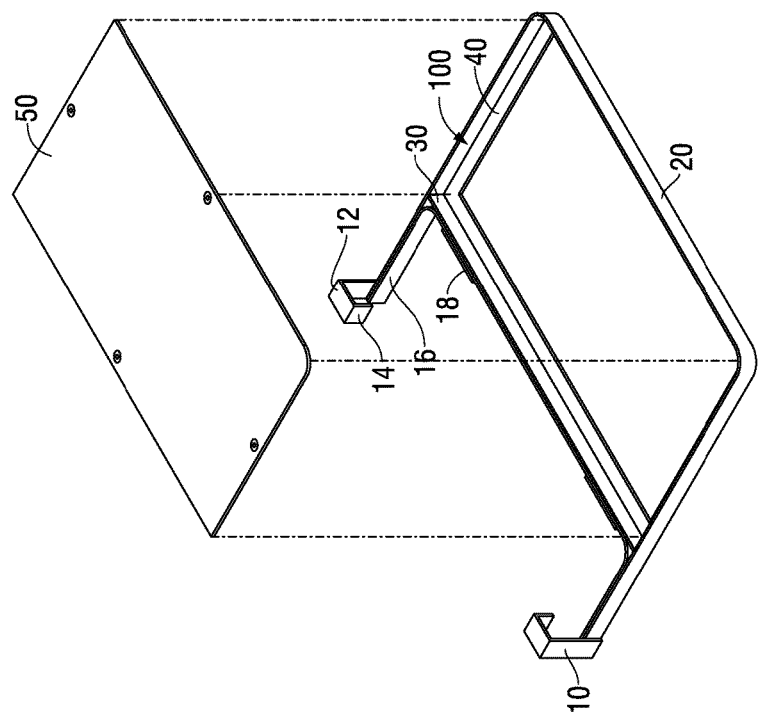

MODULAR COOLER SHELF AND METHOD OF USE

CROSS-REFERENCE TO RELATED APPLICATIONS

Not applicable

STATEMENT REGARDING FEDERALLY SPONSORED RESEARCH

Not applicable.

BACKGROUND

The present invention relates to a modular cooler shelf external to said cooler which can attach to the side anchor points found on the upper lip of the interior walls of most portable coolers, or other similar devices. It is envisioned that in several embodiments of the invention, the bottom tray of the shelf unit is modular and can be replaced with a solid tray, a net, a bag, a bucket or a fish gutting arrangement and allows a user the ability to change out the bottom tray unit for a variety of uses.

The present invention is distinguished from the following art in many ways.

The present invention is distinguished from U.S. Pat. No. 2,663,157 ("'157"). '157 uses a platform for storage, or other uses, internal to a cooler. The present invention is designed to be used specifically outside of a cooler. The present invention has advantages over this prior art in that the present invention does not impede cooler use in order to function.

The present invention is distinguished from U.S. Pat. No. 3,548,610 ("'610"). '610 addresses a tray that hangs on the exterior of a refrigerator or freezer that requires power and electronic connections. '610 utilizes a duct that circulates cold air to a tray, which hangs one long lip over the front edge of the plug in cooler. The present invention is used for portable, non-powered ice chests. The present invention hangs by cooler anchor points and has multiple uses. There is no duct work or forced air circulation in the present invention.

The present invention is distinguished from U.S. Pat. No. 4,515,421 ("'421"). In the '421 patent, the shelf has no lip on the exterior of a cooler. In the invention of '421, it does not span the width of the front, or back of a cooler. '421 has no option for a basket or other removable parts that form the pan or tray of the frame unlike the present invention.

The present invention is distinguished from U.S. Pat. No. 4,565,074 ("'074"). The invention of '074 is meant to be used for the bottom of cooler to separate water from other materials. The invention of '074 has no exterior mount to a cooler, unlike the present invention.

The present invention is distinguished from U.S. Pat. No. 4,836,403 ("'403"). The invention of '403 consists of vertically stacked trays. The invention of '403 is for a vehicle window or tailgate mount. '403 provides no options other than tray. The present invention utilizes a completed different bracket mid mounting system from '403 and provides other shelf options that differ from a tray.

The present invention is distinguished from U.S. Pat. No. 4,947,991 ("'991"). The invention of '991 applies only for condiments and is a cutting board. The invention of '991 is self-sustaining in the cooler itself and requires the cooler to be opened to function. Another distinction between '991 and the present invention is that '991 is a non-mounted cutting board.

The present invention is distinguished from U.S. Pat. No. 5,803,472 ("'472"). '472 discloses a cooler mounted side table. '472 serves only a single purpose. The invention of '472 requires the use of legs to be enabled. The invention of '472 is not portable, and can only be used on one cooler after assembly.

The present invention is distinguished from U.S. Pat. No. 6,726,050 ("'050"). '050 is a top mounted cooler tray. In the invention of '050, the cooler contents cannot be accessed while also using tray. In order to even utilize '050, mounts must be drilled into cooler surface, which is not required in the present invention. While using '050 a user cannot stand on cooler for fishing, or other activities.

The present invention is distinguished from U.S. Pat. No. 7,191,905 ("'905"). '905 is designed to hang on the door of a freezer and not a portable ice chest '905 is also not modular and hangs by suction, not by a bracket as in the present invention.

The present invention is distinguished from U.S. Pat. No. 7,334,802 ("'802"). The invention of '802 is a foldable mounted tray that sits above the cooler to allow for lid access. The invention of '802 is not modular and requires many moving parts in operation. Further '802 restricts the lid of the cooler from fully opening when in use, unlike the present invention. A user also cannot stand on the cooler of '802.

The present invention is distinguished from U.S. Pat. No. 7,415,794 ("'794"). The invention of '794 is all internal to the cooler and has no external shelving elements. A user cannot access the cooler of '794 when the top shelf is being used, unlike the present invention.

The present invention is distinguished from U.S. Pat. No. 7,954,183 ("'183"). '183 is an invention for individual tray side mounts for a cooler. The invention of the present invention uses double hangers, and not a single anchor of the '183 patent, therein increasing stability.

The present invention is distinguished from U.S. Pat. No. 8,777,045 ("'045"). '045 is an invention that does not utilize any mounting or brackets. Likewise, a user cannot stand on a closed cooler when '045 is in operation.

The present invention is distinguished from U.S. Pat. No. 8,910,819 ("'819"). '819 focuses on proprietary latches for closing and latching a cooler. There is no disclosure in '819 of any use of an external shelf as is found in the present invention.

The present invention is distinguished from U.S. Pat. No. 9,316,428 ("'428"). The invention of '428 is a cooler that, has nets, shelves, and tool storage. The invention of '428 is not an external transferable cooler shelf like the present invention. The invention of '428 cannot be utilized unless the cooler is actually open, unlike the present invention. The present invention also allows use of the shelf when the cooler is closed or opened.

SUMMARY

In several embodiments, the present invention is an externally mounted tray that inserts into a coolers tie-down slots, or anchor points, between the lid and the body. In several embodiments the tray hangs on each side of the cooler and wraps around the front, or rear of the cooler allowing use while the cooler lid is opened or closed.

It is envisioned that in several embodiments, the modular cooler shelf can be used as a prep table while picnicking or camping, a portable dining table, a net for holding items, a basket for holding items, or a fish/game cleaning rack amongst other things.

In several embodiments, the frame of the modular cooler shelf may be comprised of a strong but light-weight metal such as aluminum, or other composite, plastic, or metal material. In some embodiments of the present invent the modular tray is supported by a bracket and in some embodiments, the trays or frames have support studs, or other methods as known in the art, so that the tray can hold more weight.

In several embodiments of the present invention, the present invention comprises an inner frame loop or lip frame, an outer frame loop or insert frame, a left hanging bracket, a right hanging bracket, pan or tray bracing and a pan or tray floor unit.

In several embodiments of the present invention the present invention comprises a external portable cooler holding unit further comprising; a main frame comprising two anchor brackets, a lip frame, and a flooring or insert frame; a flooring unit; said anchor brackets are further comprised to engage anchor points on the sides of a holding unit said lip frame is further comprised to mechanically engaged said anchor brackets and also to engage the outside lip of a cooler when said anchor brackets are attached to said anchor points of a cooler said flooring frame is further comprised of a solid border extending from said lip frame away from said anchor brackets and forming a solid perimeter in to which said flooring unit can be placed in releasable communication with said perimeter. In several embodiments the portable cooler shelf further comprises said flooring unit is a solid flat floor piece forming a solid base to said flooring frame. In several embodiments the portable cooler shelf further comprises; said flooring unit is a net forming a mesh base to said flooring frame. In several embodiments the portable cooler shelf further comprises said flooring unit is a solid fish scaler with cones forming an irregular but solid base to said flooring frame. In several embodiments the portable cooler shelf further comprises; said flooring unit is a solid containing area with said flooring base. In several embodiments the portable cooler shelf further comprises; said anchor brackets are attached substantially perpendicular to said lip frame. In several embodiments the portable cooler shelf further comprises floor unit attached to a bottom of said flooring frame. In several embodiments the portable cooler shelf further comprises said lip frame is comprised of magnetic materials.

In several embodiments the present invention comprises a portable cooler shelf with a first frame comprising two anchor brackets, a lip frame, and a flooring frame, and a flooring unit; said anchor brackets are further comprised with an engagement top face designed to rest on the top lip of a cooler and a lateral face substantially perpendicular to the engagement top face, said lateral face designed to engage-anchor points on the top lip of a cooler; said lip frame is further comprised to mechanically engaged said anchor brackets and also to engage the outside lip of a cooler when said anchor brackets are attached to said anchor points of a cooler; said flooring frame is further comprised of a solid border extending from said lip frame away from said anchor brackets and forming a solid perimeter in to which said flooring unit is mechanically attached to said perimeter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

FIG. 3 is a partially exploded view of one embodiment of the present invention with a flat tray FIG. 4 is an assembled view of one embodiment of the present invention with a flat tray FIG. 5 is a bottom view of one embodiment of the flat floor pan of the present invention.

DETAILED DESCRIPTION

Figure 2:
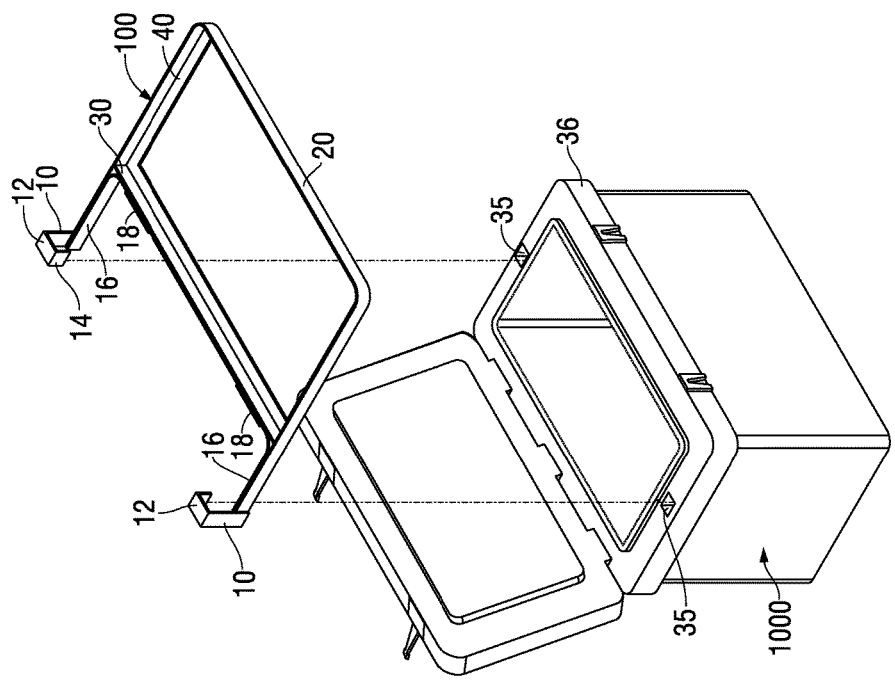
FIG. 2 is a partially assembled view of one embodiment of the present invention not attached to a cooler.

One or more illustrative embodiments incorporating the invention disclosed herein are presented below. Applicant has created a revolutionary and novel external cooler holding apparatus and method of use of the same.

In the following description, certain details are set forth such as specific quantities, sizes, etc. so as to provide a thorough understanding of the present embodiments disclosed herein. However, it will be evident to those of ordinary skill in the art that the present disclosure may be practiced without such specific details. In many cases, details concerning, such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing particular embodiments of the disclosure and are not intended to be limiting thereto. Drawings are not necessarily to scale and arrangements of specific units in the drawings can vary.

While most of the term s used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 11th Edition, 2008. Definitions and/or interpretations should not be incorporated from other patent applications, patents, or publications, related or not, unless specifically stated in this specification or if the incorporation is necessary for maintaining validity. Specifically defined terms: As utilized herein, the term "tray" or "pan" is defined as any three dimensional object capable of acting as a bottom for a frame. As utilized herein, the term "shelf" generally references one of any of the embodiments of the present inventive holding system. "Cooler", as defined herein, encompasses any storage device with anchor points capable of supporting an external shelf unit as described as the present invention.

Certain terms are used in the following description and claims to refer to particular system components. As one skilled in the art will appreciate, different persons may refer to a component by different names. This document does not intend to distinguish between components that differ in name but not function. The drawing figures are not necessarily to scale. Certain features of the invention may be shown exaggerated in scale or in somewhat schematic form, and some details of conventional, elements may not be shown, all in the interest of clarity and conciseness.

Although several preferred embodiments of the present invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

Figure 1:
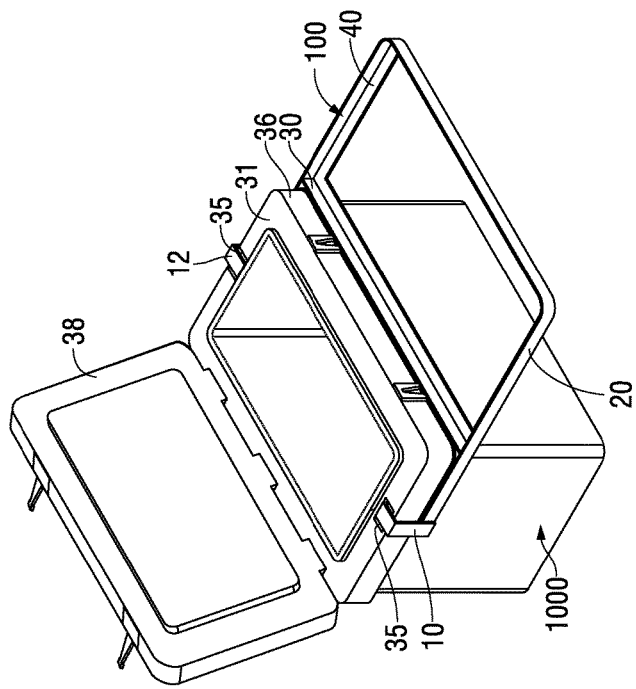
FIG. 1 is a partially assembled view of one embodiment of the present invention attached to a cooler.

As illustrated, FIG. 1 shows one embodiment of the cooler shelf 100, as attached to a standard cooler with side tie-downs or anchor holes 35. As illustrated the inventive cooler shelf 100 attaches to the anchor holes 35 via anchor bracket 10 in such a manner that the back braces 16 and lip engagement 18 of lip brace 30 physically contact and push against the cooler lip 36 when one embodiment of the present invention is assembled. It is envisioned that shelf 100 can attach, to cooler 1000 as to allow for the cooler door to open facing away, or towards shelf 100. It is also envisioned that shelf 100 can be attached to other devices that have anchor holes 35 similar to those of cooler 1000.

As further illustrated cooler shelf 100 has anchor bracket 10 and a lower frame interior bracket 40. In several embodiments of the present invention, flooring or insert frame 20 forms substantially, but not limited to a "U" shape and engages anchor brackets 10 which run perpendicular to flooring frame 20. In several embodiments, flooring or insert frame 20 can be molded with lip frame 30 or the two can be in mechanical communication with each other.

Together, flooring frame 20, lip frame 30 and interior bracket 40 form a hollow brace into which a variety of flooring units can be placed. The hollow brace can be of a variety of geometric shapes. When attached to a cooler 1000, said cooler 1000 is preferably of a design such that the cooler lid 38 can be fully closed such that the cooler 1000 fully functions as a cooler. This is an improvement over many prior art cooler shelf pieces which require a cooler to be open during operation.

Flooring or insert frame 20 is preferably made of strong, but lightweight materials such as, but not limited to, metals, plastics or other materials known in the art for support braces. Lip frame 30 is preferably made of strong, but lightweight materials such as, but not limited to, metals, plastics or other materials known in the art for support braces. Interior bracket 40 is preferably made of strong, but lightweight materials such, as, but not limited to, metals, plastics or other materials known in the art for support braces.

FIG. 2 illustrates one embodiment of the present invention in which the present inventive cooler shelf 100 is not attached to cooler 1000. In this illustration further aspects of many embodiments of the present invention are provided. As shown in several embodiments of the present invention anchor bracket 10 has engagement top face 12 and lateral face 14. Engagement top face 12 is designed to rest on cooler lip top 31 when the invention 100 engages cooler 1000 (FIG. 1). Lateral face 14 of anchor bracket 10 is in mechanical communication with top fees 12 and actually releasably slides into anchor point 35 when the invention 100 engages cooler 1000 so as to keep invention 100 releasably attached to cooler 1000. Bracket anchor 10 is preferably made of strong, but lightweight materials such as, but not limited to, metals, plastics or other materials known in the art for shelf brackets.

Figure 9:
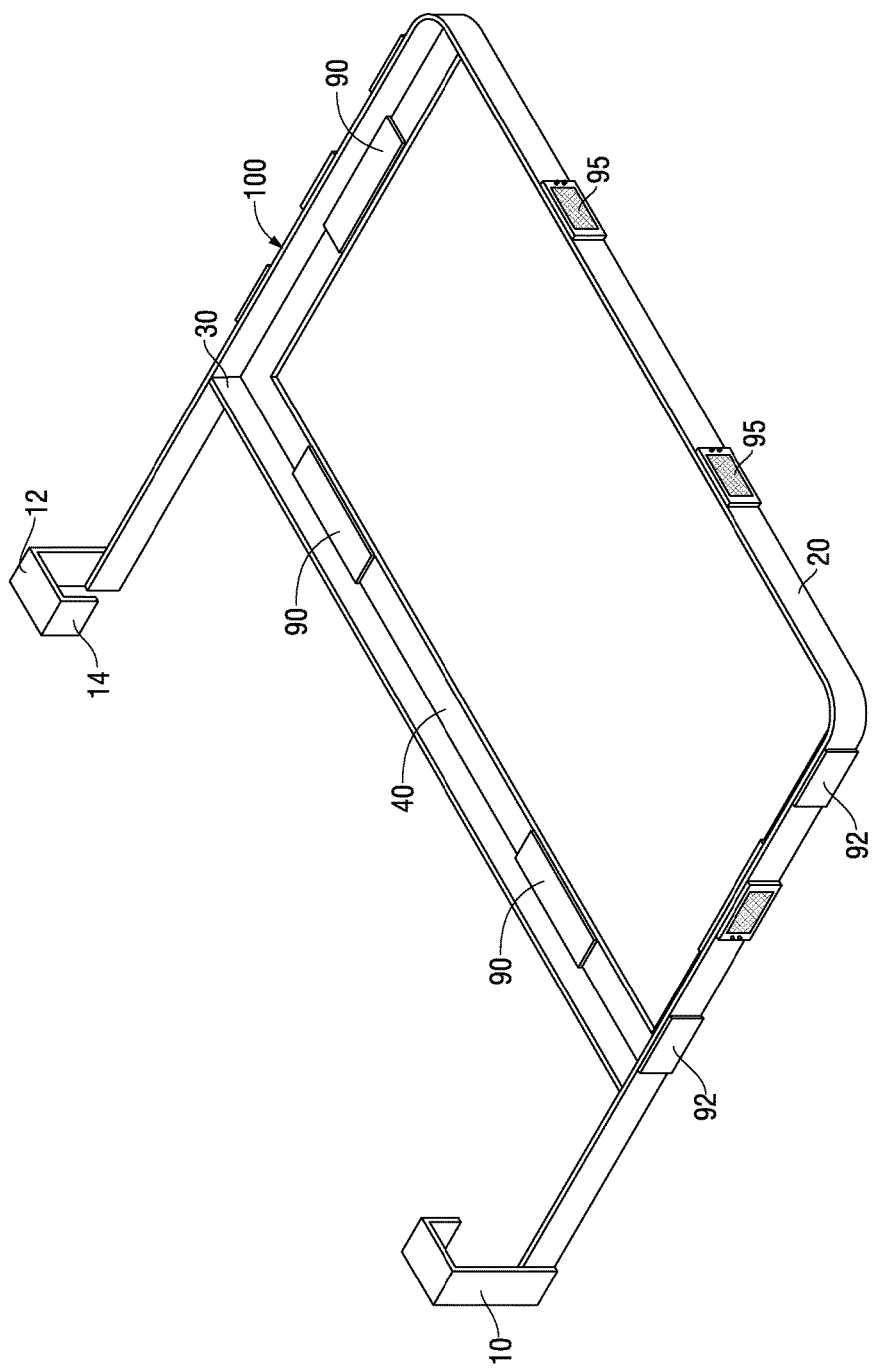
FIG. 9 is a partially assembled view of one embodiment of the present invention without a tray but with magnetic attachments and led frame attachments.

Further illustrated in FIG. 2 are back braces 16 and 18. In some embodiments of the present invention back, braces 16 form a curved supporting "L" shape that helps to reinforce anchor bracket 10 with flooring or insert frame 20 and lip frame 30. Back braces 16 are preferably made of strong, but lightweight materials such as, but not limited to, metals, plastics or other materials known in the art for support braces. In several embodiments of the present invention, back braces 16 are not necessary for operation (FIG. 9). In some embodiments of the present invention lip engagement faces 18 attach to back braces 16 to act as an engagement surface between the cooler 1000 and back braces 16 when the present invention 100 engages cooler 1000. Engagement, faces 18 are preferably made of strong, but lightweight materials such as, but not limited to, metals, plastics or other materials known in the art for support braces. In several embodiments of the present invention, engagements faces 18 are not necessary for operation (FIG. 9).

FIG. 3 illustrates one exploded version of one embodiment of the present invention. As illustrated flat floor piece 50 is preferably designed to releasably engage and fit into the area made by flooring or insert frame 20 and lip frame 30. In many embodiments flat floor piece 50 will reset on interior bracket 40 when engaged fully. Flat floor piece 50 is preferably made of strong, but lightweight materials such as, but not limited to, metals, plastics or other materials known in the art for floor pieces. All inserts and frames can be of variant geometric configurations.

FIG. 4 illustrates an assembled version of one embodiment of the present invention in which flooring or insert frame 20 is engaged with flat floor piece 50. In this embodiment it is preferred that there are no open gaps between flooring or insert frame 20 and flat floor piece 50.

Figure 6:
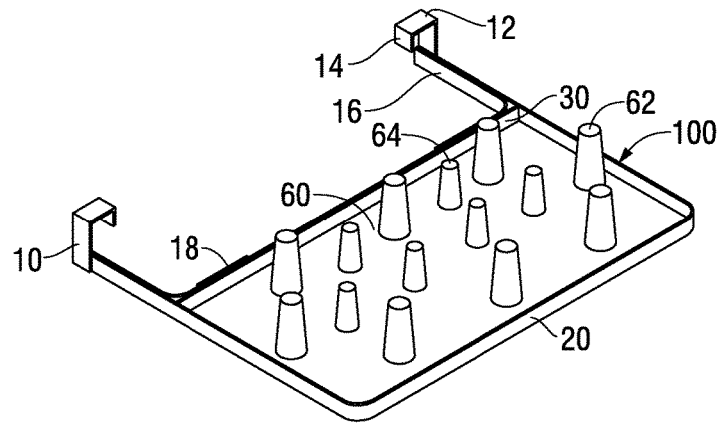
FIG. 6 is an assembled view of one embodiment of the present invention with a fish scaling, or stripping mat.
Figure 7:
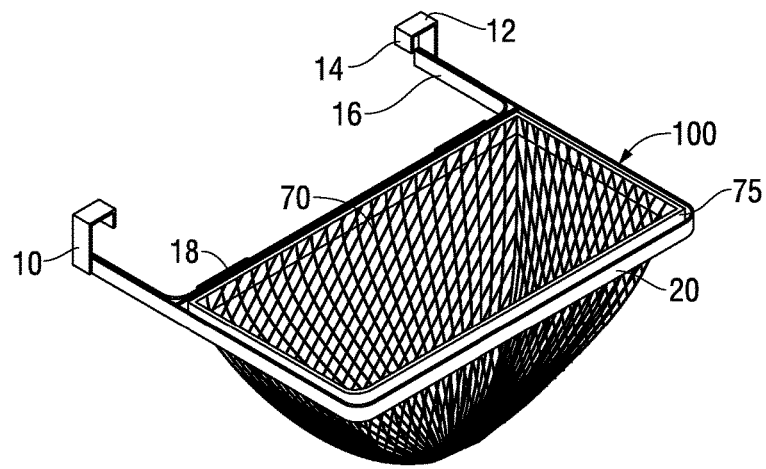
FIG. 7 is an assembled view of one embodiment of the present invention with a net.

FIG. 5 illustrates one embodiment of the flat flooring piece of the present invention. As shown flat, flooring piece 50 has fasteners 52 on the underside which can be rotated to extend past the perimeter of flat flooring piece 50 and actually engage the under face of interior bracket 40 therein more securely holding flat flooring face 50 to interior bracket 40 when assembled. FIGS. 6-7 all illustrate different embodiments of the present invention with different flooring units. It is important to note that each flooring unit embodiment can have fasteners 52 on the underside which can be rotated to extend past the perimeter of flooring unit and actually engage the under face of interior bracket 40 therein more securely holding flat flooring unit to interior bracket 40 when assembled.

As shown in FIG. 6, in one embodiment of the invention, flooring unit is constructed to be a stripping mat 60. As shown fish stripping mat 60 is designed to have variant size cone shaped extrusions 62 and 64 upon which fish can be put for the purpose of being cleaned, scaled or treated in other manners common to fishing. Fish scaling unit 60 is preferably made of strong, but lightweight materials such as, but not limited to, metals, plastics, or other materials known in the art for fish scaling units. Fish stripping mat 60 can also be used for the purpose of gathering and keeping fly line from falling off a boat or becoming tangled while in use.

As shown in FIG. 7, in one embodiment of the present invention, flooring unit is constructed to be a net unit 70 with and outer rim 75. In many embodiments of the present invention rim 75 directly sits on interior bracket 40 when the device is assembled. Net unit 70 is preferably made of strong, but lightweight materials such as, but not limited to, nylon, cotton or other materials known in the art for nets. Rim 75 is preferably made of strong, but lightweight materials such as, but not limited to, metals, plastics or other materials known in the art for rims of nets.

Figure 8:
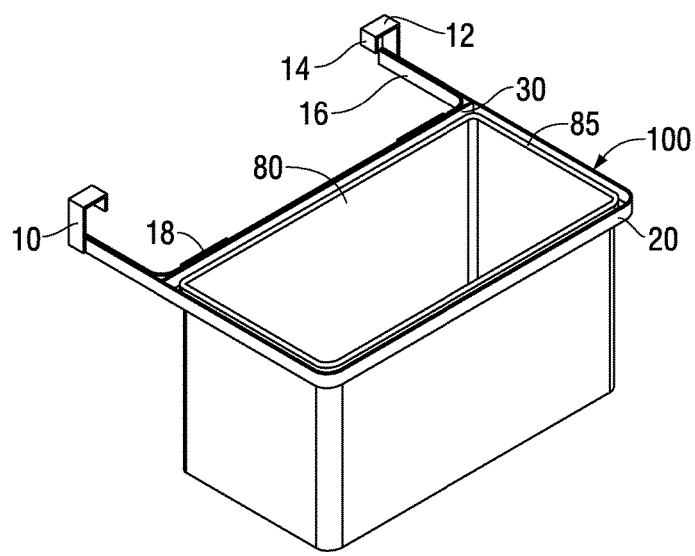
FIG. 8 is an assembled view of one embodiment of the present invention with a bucket

As shown in FIG. 8, in one embodiment of the present invention, flooring, unit is constructed to be a bucket unit 80 with and outer rim 85. In many embodiments of the present invention rim 85 directly sits on interior bracket 40 when the device is assembled. Bucket unit 80 is preferably made of strong but lightweight materials such as, but not limited to, metals, plastics or other materials known in the art for buckets. Rim 85 is preferably made of strong, but lightweight materials such as, but not limited to, metals, plastics or other materials known in the art for rims of buckets.

FIG. 9 illustrates one embodiment of the present invention in which there are additions to flooring or insert frame 20 and interior bracket 40. As shown in this embodiment, optional magnetic strips 90 are added to interior bracket 40 such that when any magnetizable object is placed onto magnetic strips 90 it will be held by magnetic attraction. In practice rims 75 and 85, fish scaling unit 60, or flat flooring piece 50 could be held down by magnetic attraction. Shown are optional LED light fixtures 95 which can be attached to flooring or insert frame 20 as known in the art. LED light fixtures 95 are preferably designed to be able to be activated such that a user can activate light fixtures 95 on flooring or insert frame 20 such that light will be emitted around the exterior perimeter of flooring or insert frame 20 in low light conditions. The added light emitted allows a user to utilize the present invention 100 in any conditions. Also shown are optional magnetic strips 92 are added to the exterior of flooring or insert frame 20. When any magnetizable object is placed onto magnetic strips 92 it will be held by magnetic attraction. In practice items such as utensils, knives, flashlights, or other common goods could be held down by magnetic attraction.

FIG. 9 also illustrates one embodiment of the present invention in which lip engagement faces 18 do not attach to back braces 16 and do not act as an engagement surface between the cooler 1000 and back braces 16 when the present invention 100 engages cooler 1000.

In one embodiment, the present invention is attached to a cooler 1000 in the following manner: a flooring unit (bucket unit 80, fish stripping mat 60, net 70, or flat flooring face 50) lowered on interior bracket 40 and the complete inventive unit 100 is then placed over an open cooler 1000. The inventive unit 100 is then aligned such that anchor brackets 10 are parallel to anchor ports 35. The inventive unit is then lowered such that lateral faces 14 enter into and engage anchor ports 35 and engagement top face 12 rests on cooler lip top 3.

In alternate embodiments the present invention is attached to a cooler 1000 in the following manner: inventive unit 100 (absent a flooring unit) is placed over an open cooler 1000. The inventive unit 100 is then aligned such that anchor brackets 10 are parallel to anchor ports 35. The inventive unit is then lowered such that lateral faces 14 enter into and engage anchor ports 35 and engagement top face 12 rests on cooler lip top 3. After this step a flooring unit (bucket unit 80, fish stripping mat 60, net 70, or flat flooring face 50) lowered on interior bracket 40.

The inventive shelf 100 is portable and can be removed from the cooler 1000 by simply reversing the steps taken to attach the unit 100 to the cooler 1000.

While preferred embodiments have been shown and described, modifications thereof can be made by one skilled in the art without departing from the scope or teaching herein. The embodiments described herein are exemplary only and are not limiting. Many variations and modifications of the system and apparatus are possible and will become apparent to those skilled in the art once the above disclosure is fully appreciated. For example, the relative dimensions of various parts, the materials from which the various parts are made, and other parameters can be varied. Furthermore, though the frames and inserts are shown as rectangular in shape they may include other shapes such as, but not limited to semi-ovals or squares. Accordingly, it is intended that the following claims be interpreted to embrace all such variations and modifications.

I claim:

1. A portable external cooler shelf unit comprising;
  a main frame comprising two anchor hole brackets with two top engagement faces extending toward-one another and the two lateral faces substantially parallel to each other in mechanical communication with the two top engagement faces extending toward one another, a lip frame, "U" shaped insert frame; and a flooring unit;
  said anchor hole brackets with the two top engagement faces extending toward one another and the two lateral faces substantially parallel to each other in mechanical communication with the two top engagement faces extending toward one another are further disposed to engage anchor points on the sides of a cooler;
  said lip frame is further disposed to mechanically engage said anchor hole brackets with the two top engagement faces extending toward one another and the two lateral faces substantially parallel to each other in mechanical communication with the two top engagement faces extending toward one another and also to engage the outside lip of a said cooler when said anchor hole brackets with the two top engagement faces extending toward one another and the two lateral faces substantially parallel to each other in mechanical communication with the two top engagement faces extending toward one another are attached to said anchor points of a cooler via the two top engagement faces extending, toward one another;
  said insert frame is further comprised of a border extending from said lip frame away from said anchor hole brackets with the two top engagement faces extending toward one another and the two lateral faces substantially parallel to each other in mechanical communication with the two top engagement faces extending toward one another and forming a perimeter in to which said flooring unit can be placed in releasable communication with said perimeter.

2. The portable external cooler shelf of claim 1 in which said flooring unit is a solid flat floor piece forming a solid base to said insert frame.

3. The portable external cooler shelf of claim 1 in which said flooring unit is a net forming a mesh base to said flooring insert frame.

4. The portable external cooler shelf of claim 1 in which said flooring unit is a stripping mat with cones forming an irregular but solid base to said insert frame.

5. The portable external cooler shelf of claim 1 in which said flooring unit is a solid containing area with said lip frame and said insert frame.

6. The portable external cooler shelf of claim 1 in which said anchor hole brackets with the two top engagement faces extending toward one another and the two lateral faces substantially parallel to each other in mechanical communication with the two top engagement faces extending toward one another are attached substantially perpendicular to said lip frame.

7. The portable external cooler shelf unit of claim 1 further comprising the flooring unit mechanically attached to a bottom of said "U" shaped insert frame.

8. The portable external cooler shelf of claim 1 further comprising said lip frame is comprised of magnetic materials.

9. The portable external cooler shelf of claim 1 in which said brackets allow for the free movement of a lid on the cooler into an open or closed position.

10. A portable cooler shelf comprising;
a first frame comprising two anchor hole brackets with two top engagement faces extending toward one another and the two lateral faces substantially parallel to each other in mechanical communication with the two top engagement faces extending toward one another, a lip frame, a "U" shaped insert frame, and a flooring unit;
said anchor hole brackets with the two top engagement faces extending toward one another and the two lateral faces substantially parallel to each other in mechanical communication with the two top engagement faces extending toward one another are further disposed of the two top engagement faces designed to rest on a top lip of a cooler and the two lateral faces substantially parallel to each other substantially perpendicular to the two top engagement faces, said two lateral faces substantially parallel to each other designed to engage anchor points on the top lip of the cooler;
said lip frame is further disposed to mechanically engage said anchor hole brackets with the two top engagement faces extending toward one another and the two lateral faces substantially parallel to each other in mechanical communication with the two top engagement faces extending toward one another and also to engage an outside lip of said cooler when said anchor hole brackets with the two engagement faces extending toward one another and the two lateral faces substantially parallel to each other in mechanical communication with the two top engagement faces extending toward one another are attached to said anchor points of a cooler via said two top engagement faces extending toward one another;
said "U" shaped insert frame is further comprised of a border extending from sail lip frame away from said anchor hole brackets with the two top engagement faces extending toward one another and the two lateral faces substantially parallel to each other in mechanical communication with the two top engagement faces extending toward one another and forming a perimeter in which said flooring unit is mechanically attached to said perimeter.

11. The portable external cooler shelf of claim 10 in which said flooring unit is a solid flat floor piece.

12. The portable external cooler shelf of claim 10 in which said flooring unit is a net.

13. The portable external cooler shelf of claim 10 in which said flooring unit is a scaling mat with cones.

14. The portable external cooler shelf of claim 10 in which said flooring unit is a solid tub.

15. The portable external cooler shelf of claim 10 in which said anchor hole brackets with the two top engagement faces extending toward one another and the two lateral faces substantially parallel to each other in mechanical communication with the two top engagement faces extending toward one another are attached substantially perpendicular to said lip frame.

16. The portable external cooler shelf of claim 10 further comprising the flooring unit attached to a bottom of said "U" shaped insert frame.

17. The portable external cooler shelf of claim 10 further comprising said lip frame is comprised of magnetic materials.

18. The portable external cooler shelf of claim 10 in which said brackets allow for the free movement of a lid on the cooler into an open or closed position.

* * * * *